United States Patent
Afshar (10) Patent No.: US 10,277,091 B2
(45) Date of Patent: Apr. 30, 2019

(54) MOTOR CAP ASSEMBLY FOR REDUCING INTERNAL TEMPERATURES

(71) Applicant: Asia Connection LLC, New York, NY (US)

(72) Inventor: Reza Afshar, Westlake Village, CA (US)

(73) Assignee: Asia Connection LLC, New York, NY (US)

( * ) Notice: Subject to any disclaimer, the term of this patent is extended or adjusted under 35 U.S.C. 154(b) by 0 days.

(21) Appl. No.: 15/611,330

(22) Filed: Jun. 1, 2017

(65) Prior Publication Data

US 2017/0268521 A1    Sep. 21, 2017

Related U.S. Application Data (62) Division of application No. 14/540,383, filed on Nov. 13, 2014, now Pat. No. 9,726,188.

(60) Provisional application No. 61/903,583, filed on Nov. 13, 2013.

(51) Int. Cl.
| | |
|---|---|
| H02K 5/22 | (2006.01) |
| H02K 11/33 | (2016.01) |
| F04D 27/00 | (2006.01) |
| F04D 15/00 | (2006.01) |
| F04D 13/06 | (2006.01) |
| F04D 25/06 | (2006.01) |

(52) U.S. Cl.
CPC ............... *H02K 5/22* (2013.01); *H02K 11/33* (2016.01); *F04D 13/0686* (2013.01); *F04D 15/0066* (2013.01); *F04D 25/06* (2013.01); *F04D 27/004* (2013.01); *H02K 2203/03* (2013.01)

(58) Field of Classification Search
CPC . H02K 5/22; H02K 9/02; H02K 11/33; H02K 2203/03; F04D 25/06; F04D 13/0686; F04D 15/0066; F04D 27/004
USPC .................................. 310/59, 64, 67 R, 68 R
See application file for complete search history.

(56) References Cited

U.S. PATENT DOCUMENTS

| | | | | |
|---|---|---|---|---|
| 5,714,816 A * | 2/1998 | Jensen | ................... | H02K 11/33 310/64 |
| 6,657,338 B2 * | 12/2003 | Fisher | ................... | H02K 17/30 310/68 R |
| 6,750,578 B2 * | 6/2004 | Buening | ................... | H02K 5/20 310/52 |
| 7,420,302 B2 * | 9/2008 | Archer | ..................... | H02K 5/15 310/68 R |
| 8,461,733 B2 * | 6/2013 | Takechi | ............... | H02K 19/365 310/257 |
| 9,726,188 B2 * | 8/2017 | Afshar | ..................... | F04D 25/06 |
| 2009/0153001 A1 | 6/2009 | Horng et al. | | |

(Continued)

*Primary Examiner* — John K Kim
(74) *Attorney, Agent, or Firm* — Dilworth & Barrese, LLP (57) ABSTRACT

Disclosed is an end cap for a motor housing containing an electric motor, including a tubular structure defining an interior space, including an open first end connectable to the mater casing; a second end, including a first planar surface; a second planar surface offset from the first planar surface and substantially parallel to the first planar surface; and at least one air grate surface substantially perpendicular to the first planar surface and the second planar surface, positioned between and attached to the first planar surface and the second planar surface, and wherein the at least one air grate surface includes at least one air grate configured to permit air flow into and/or out of the interior space.

10 Claims, 11 Drawing Sheets

(56) References Cited

U.S. PATENT DOCUMENTS

2014/0217844 A1* 8/2014 Cocks .................. H02K 5/18
　　　　　　　　　　　　　　　　　　　310/64
2015/0130305 A1* 5/2015 Afshar ................ F04D 25/06
　　　　　　　　　　　　　　　　　　　310/59
2017/0268521 A1* 9/2017 Afshar ................ F04D 25/06

* cited by examiner

MOTOR CAP ASSEMBLY FOR REDUCING INTERNAL TEMPERATURES

PRIORITY

This application claims the benefit of U.S. Provisional Application No. 61/903,583, filed Nov. 13, 2013, the entire content of which is incorporated herein by reference.

TECHNICAL FIELD

The present disclosure generally relates to motors, motor controllers, systems and methods for controlling motors in various applications, and more particularly, to a motor connected to a pump having a dual speed pump controller for controlling the operation of recirculating pumps used in swimming pool environments.

BACKGROUND

Standard recirculating pumps having a motor section and a pump section are often used in swimming pool environments in connection with the filtering systems. The pumps are often high capacity pumps that move thousands of gallons per hour. The electric power required to move these large volumes of water is often very high and create high temperatures in the motor section.

Controllers for the pumps are often required to control the operation of the motor, for example, many federal and local governments have enacted laws and regulations to curtail the high electric use. Due to high temperatures in the end caps of the motor, controllers are usually remote from the motor and require extensive wiring connections between the controller and motor to control the motor operation. In addition, the controller will require a separate housing to protect the controller circuitry.

Attempts that have been made to design pumps to operate within temperature tolerances to prevent damage to the controllers contained in the motor section, none of which adequately address the problem at hand.

This disclosure describes improvements over these prior art technologies.

SUMMARY

Accordingly, an end cap for a motor housing containing an electric motor is disclosed. The end cap assembly can include a tubular structure defining an interior space, which can include an open first end connectable to the motor casing; a second end, which can include a first planar surface; a second planar surface offset from the first planar surface and substantially parallel to the first planar surface; and at least one air grate surface substantially perpendicular to the first planar surface and the second planar surface, positioned between and attached to the first planar surface and the second planar surface, and wherein the at least one air grate surface includes at least one air grate configured to permit air flow into and/or out of the interior space.

In the end cap the at least one air grate surface can include two air grates each positioned substantially along a different radial line of the end cap.

In the end cap the air grate surface can be one of a planar surface or an arcuate surface.

The end cap can further include circuit board mountings positioned within the interior space configured to attach a circuit board thereto; and end cap mountings positioned to attach the end cap to the electric motor.

In the end cap the air grate surface can include at least two air grates positioned such that as the motor rotates a directional air flow is created within the interior space generating air flow through the air grates with one air grate as an intake air grate and the other grate as an exhaust air grate.

In the end cap the air grates can be each positioned substantially parallel to radial lines of the end cap.

In the end cap the air grate surface can define at least one switch receptacle configured to mount a control switch therein.

Accordingly, a motor assembly having a shaft end and a motor end is disclosed. The motor assembly can include an end cap removably connectable to the motor assembly at the motor end and defining a tubular space therein, which can include a first an open first end connectable to the motor end; a second end, which can include a first planar surface; a second planar surface offset from the first planar surface and substantially parallel to the first planar surface; and at least one air grate surface positioned between the first planar surface and the second planar surface and substantially perpendicular to the first planar surface and the second planar surface, the air grate surface including at least one air grate configured to permit air flow into and/or out of the interior space; and a motor control module having a substantially semi-circular design and configured to be mounted within the tubular space of the end cap and electrically connectable to the motor to provide control to the motor.

In the motor assembly the at least one air grate surface can include two air grates each positioned substantially along a different radial line of the end cap.

In the motor assembly the air grate surface can be one of a planar surface or an arcuate surface.

The motor assembly can further include circuit board mountings positioned within the interior space configured to attach a circuit board thereto; and end cap mountings positioned to attach the end cap to the electric motor.

In the motor assembly the air grate surface can include at least two air grates positioned such that as the motor rotates a directional air flow is created within the interior space generating air flow through the air grates with one air grate as an intake air grate and the other grate as an exhaust air grate.

In the motor assembly the air grates can be each positioned substantially parallel to radial lines of the end cap.

In the motor assembly the air grate surface can define at least one switch receptacle configured to mount a control switch therein.

Accordingly, disclosed is a control module for controlling a motor and mountable within an interior tubular cavity of a tubular end cap of a motor assembly. The control module can include a circuit board having a substantially semi-circular configuration with a diameter less than a diameter of the interior tubular cavity and mountable within the interior tubular cavity.

BRIEF DESCRIPTION OF THE DRAWINGS

The present disclosure will become more readily apparent from the specific description accompanied by the attached drawings, in which.

Like reference numerals indicate similar parts throughout the figures.

DETAILED DESCRIPTION

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure.

Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure.

Reference will now be made in detail to the exemplary embodiments of the present disclosure, which are illustrated in the accompanying figures.

Controllers are often used to control the operation of a motor. The motors can operate various devices, for example, pumps, vehicles, cooling units, etc. One example of a pump/motor assembly having a controller is disclosed in U.S. application Ser. No. 14/536,929, filed Nov. 10, 2014, and entitled DUAL SPEED MOTOR CONTROLLER AND METHOD FOR OPERATION THEREOF, the entire contents of which are incorporated herein by reference.

Figure 1:
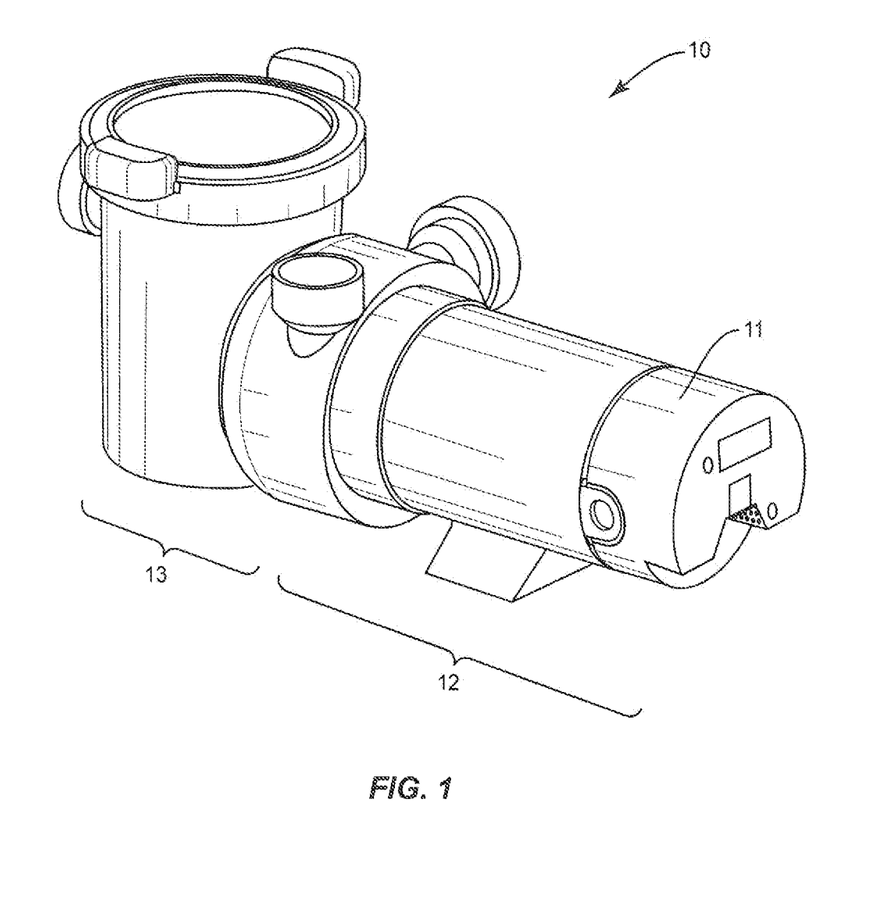
FIG. 1 is a side perspective view of a pump/motor assembly including a motor end cap according to the present disclosure.
Figure 2:
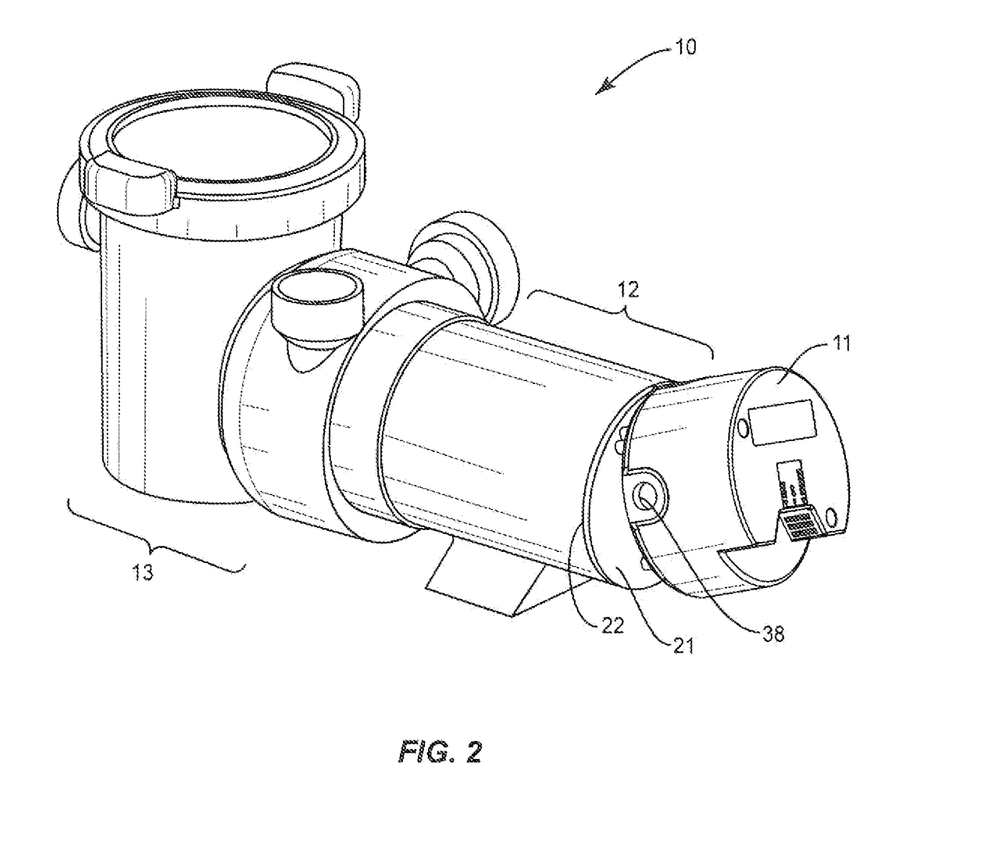
FIG. 2 is a side perspective view of a pump/motor assembly including a partially-removed motor end cap according to the present disclosure.
Figure 8:
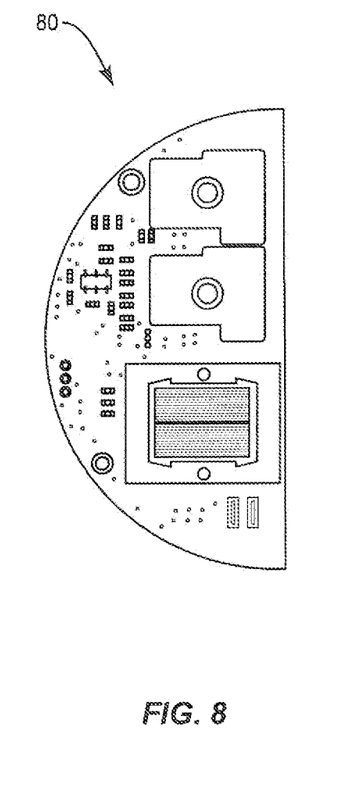
FIG. 8 is a top plan view of a circuit board for use in a motor end cap according to the present disclosure.
Figure 9:
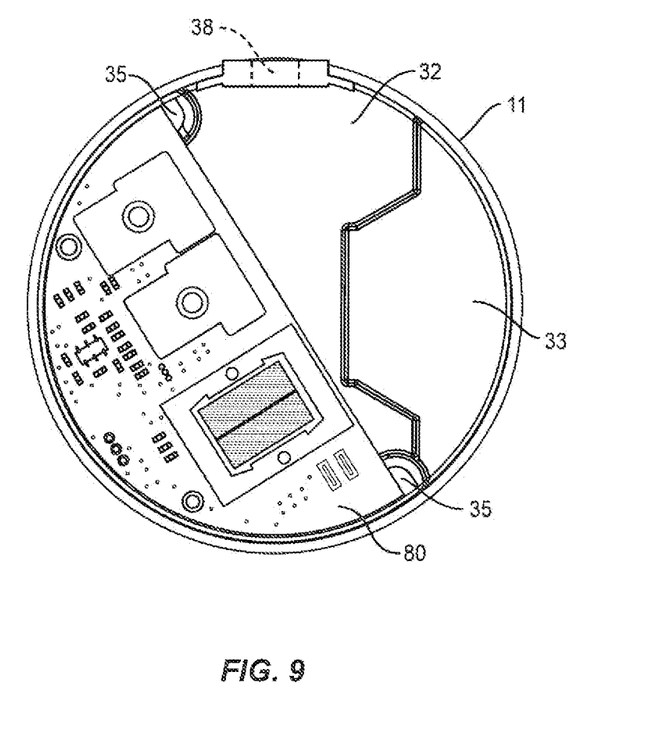
FIG. 9 is a bottom plan view of a motor end cap with a circuit board included therein according to the present disclosure.

A pump/motor assembly 10 according to the present disclosure includes a pump section 13 and a motor section 12. Motor section 12 includes novel end cap 11. Controller circuit board 80 (see FIG. 8) is designed to fit within motor end cap 11 as shown in FIG. 9. End cap 11 is removable from motor section 12 to expose motor 21 contained within motor housing 22. (See FIG. 2).

End cap 11 comprises a tubular body 31, open at one end and closed at the other. The closed end includes a first planar surface 32, a second planar surface 33, and at least one air grate surface 34. First planar surface 32 is substantially parallel to second planar surface 33. The at least one air grate surface 34 is substantially perpendicular to and positioned between first and second planar surfaces 32/33. The at least one air grate surface 34 includes an air grate 36 to permit airflow there through.

Figure 3:
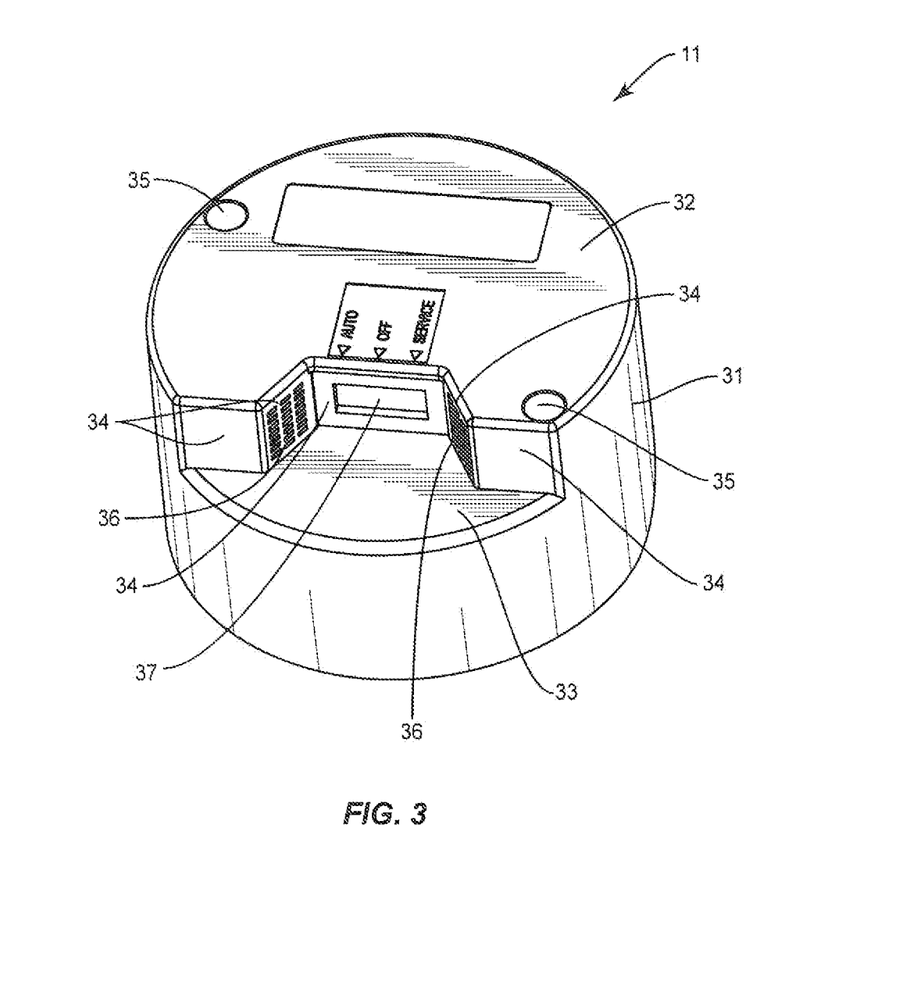
FIG. 3 is a top perspective view of a motor end cap according to the present disclosure.
Figure 4:
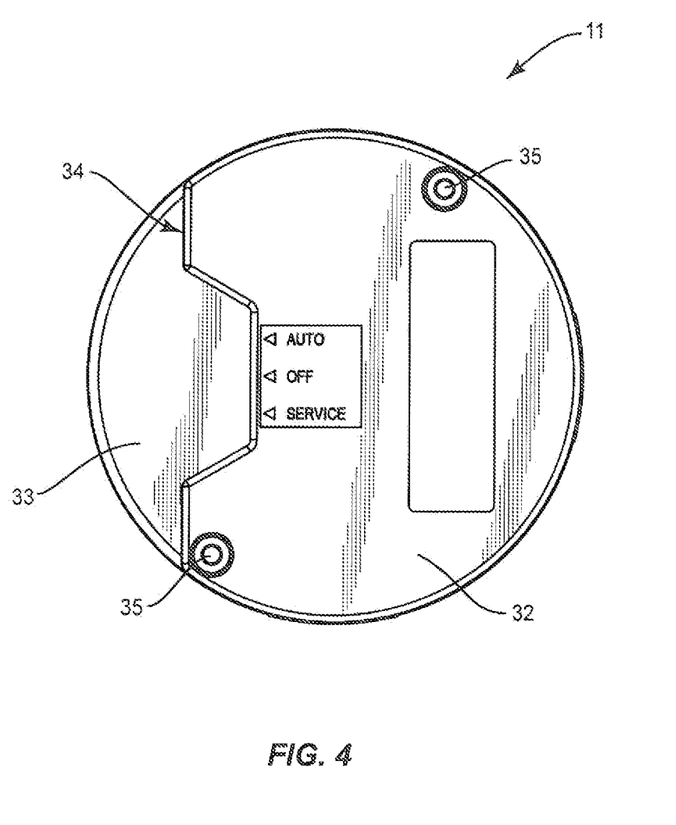
FIG. 4 is a top plan view of a motor end cap according to the present disclosure.
Figure 5:
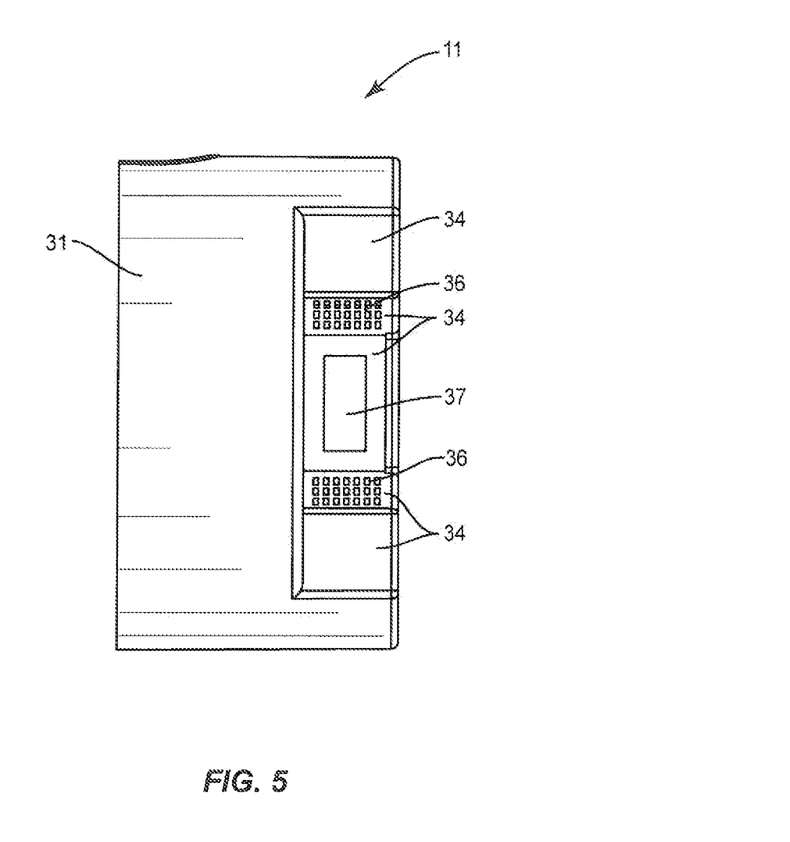
FIG. 5 is a side plan view of a motor end cap according to the present disclosure.

In an embodiment illustrated in FIG. 3, five air grate surfaces 34a-34e are shown, two of which, i.e. 34b and 34d, include air grates 36i and 36e, respectively. In another embodiment illustrated in FIG. 10, one air grate surface 34 is shown, having a single air grate 36. Other configurations varying the number of air grate surfaces 34 and air grates 36 are contemplated. For example, although air grate surface is shown as a planar surface, as shown in FIG. 11 the air grate surface can be configured as an arcuate surface having one or more air grates positioned thereon. Other configurations having a combination of planar and arcuate surfaces are also contemplated.

The embodiment of FIG. 3 shows a plurality of air grate surfaces connected in series, at least two of which include air grates positioned substantially opposite each other such that as the motor rotates a directional air flow is created in the interior space with one air grate being an intake air grate and the other grate being an exhaust air grate.

In operation, as the motor spins, air currents will be produced through air grates 36. The air currents will flow into and out of the interior of end cap 11. This continuous air flow will continuously cool the interior of end cap 11 and thus cool controller circuit board 80, thus protecting controller circuit board 80 from overheating.

Figure 7:
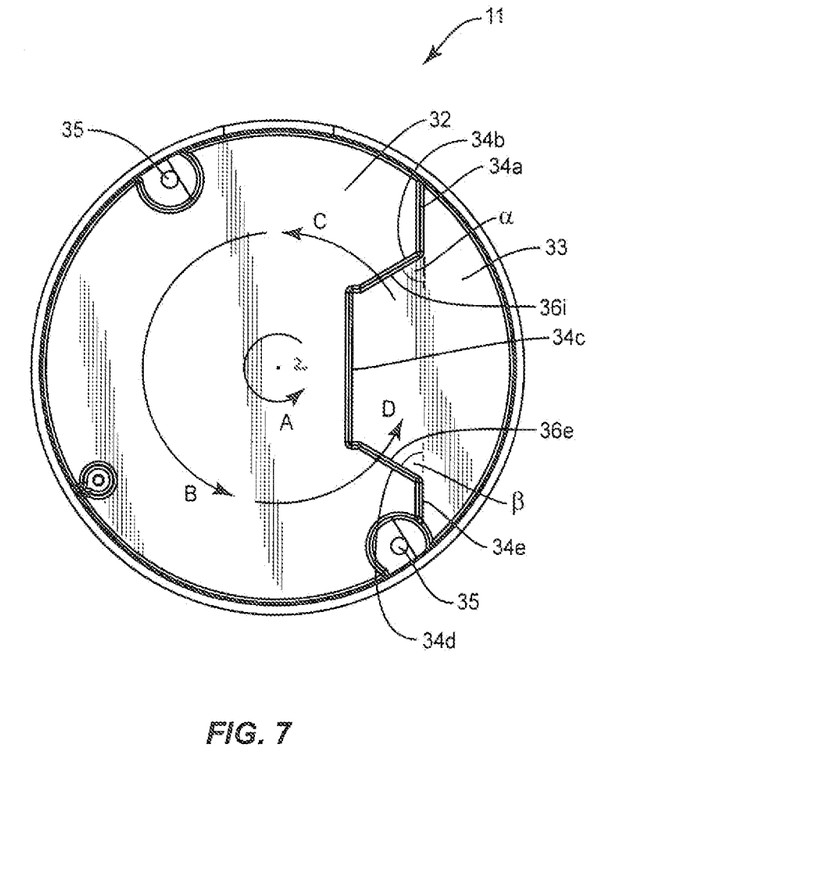
FIG. 7 is a bottom plan view of a motor end cap according to the present disclosure.

In a preferred embodiment and described with reference to FIG. 7, planar surface 34 includes 2 air grate surfaces 34b and 34d each including an air grate 36. The positioning of surfaces 34b and 34d are selected to maximize the air flow produced as an effect of the rotation of the motor. As motor rotates about axis z in direction A the rotation causes air flow within tubular body 31 in direction B. Intake air grate 36i permits air flow into tubular body 31 in direction C and exhaust air grate 36e permits air flow out of tubular body 31 in direction D. Angles α and β are selected to maximize the air flow and can change based on the position of the planar surfaces 34b and 34d. Air flow can be maximized when an air grate is substantially perpendicular to the air flow at the position of the air grate. In other words, air grates positioned substantially along radial lines of the end cap can maximize the air flow. In addition, although the configuration shown is substantially symmetrical about a line between the 2 air grates, other non-symmetrical designs are contemplated.

Figure 10:
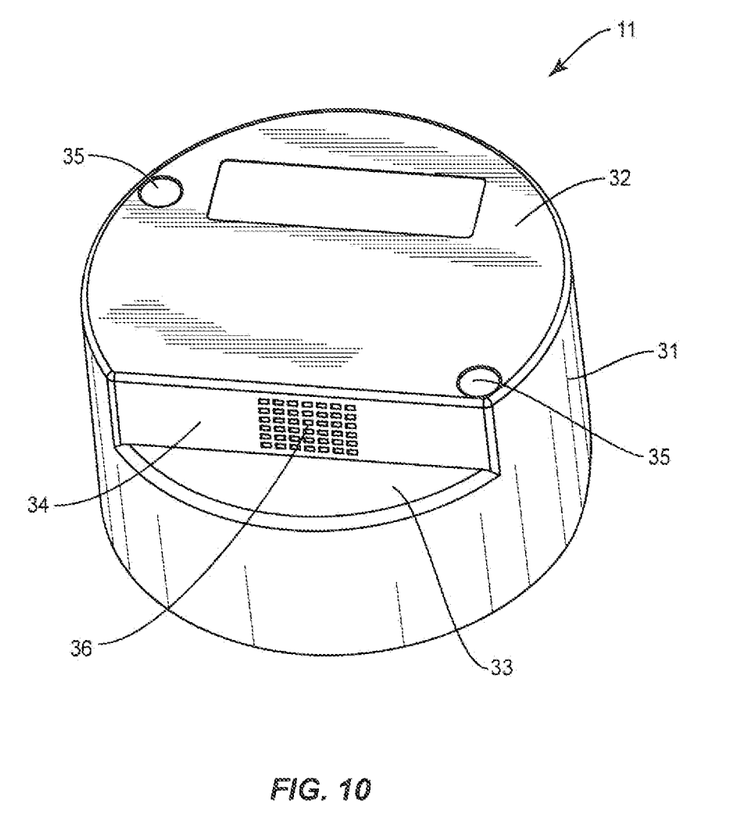
FIG. 10 is a top perspective view of a motor end cap according to the present disclosure.
Figure 11:
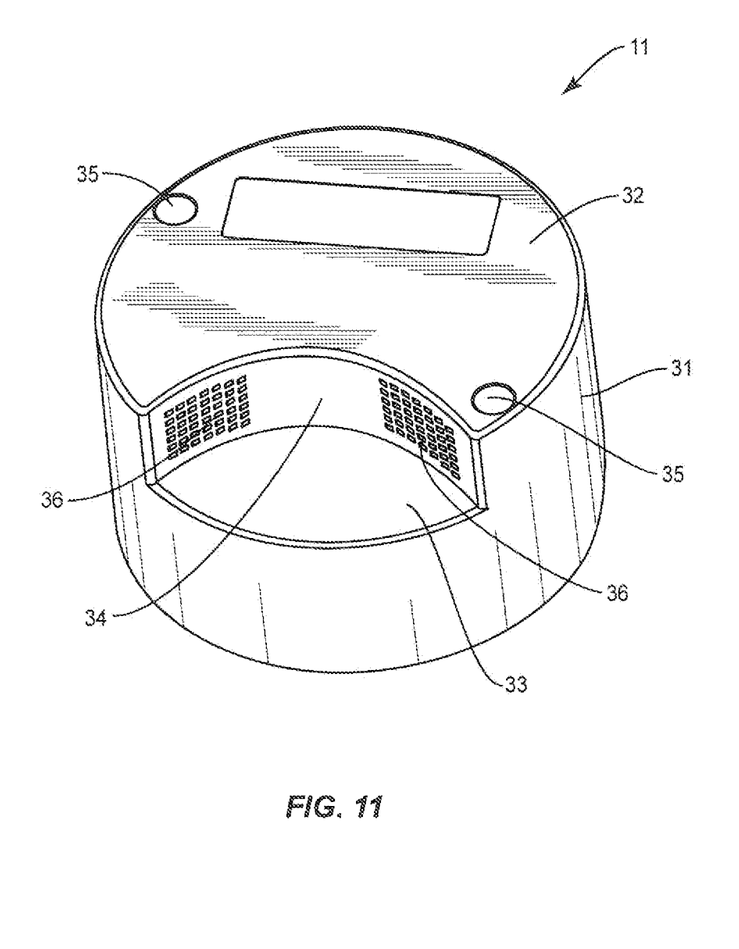
FIG. 11 is a top perspective view of a motor end cap according to the present disclosure.

In the embodiment of FIG. 10, the air flow can be further maximized if the single planar surface 34 is provided with 2 air grates spaced apart from each other and the planar surface is positioned substantially on a diameter line of the end cap. This will position the air grates substantially perpendicular to the direction of the air flow at the each air grate.

Also shown in FIG. 3 is optional switch cut-out 37 positioned within one of the at least one air grate surfaces 34 into which a switch (not shown) can be mounted to provide input to the controller circuit board 80 as described in U.S. application Ser. No. 14/536,929. Also includes are screw receptacles 35 to receive a screw to attach end cap 11 to motor housing 22 and/or motor 21. End cap 11 can also include a power cord access 38 to permit connection of electric power to the electrical components of the pump/motor assembly 10.

Figure 6:
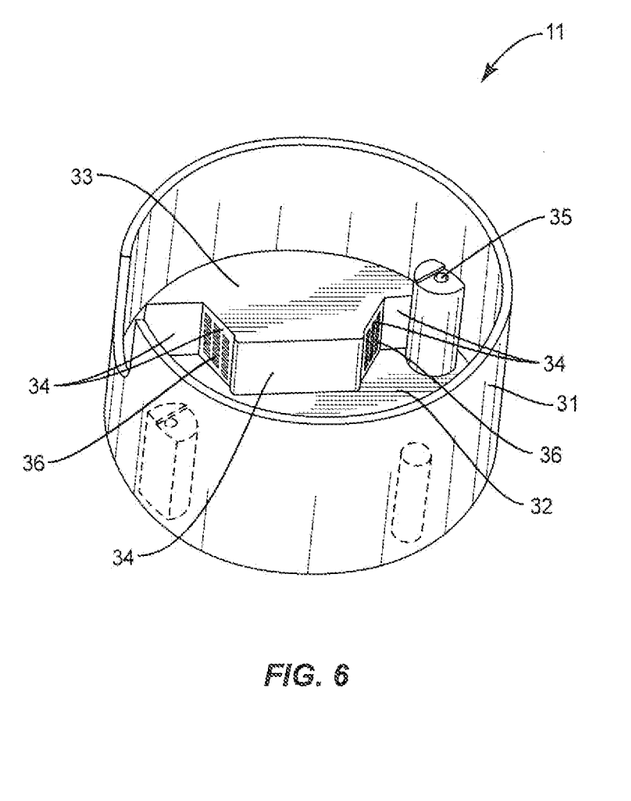
FIG. 6 is a bottom perspective view of a motor end cap according to the present disclosure.

The interior of end cap 11 is mostly hollow and designed to accept controller circuit board 80. For example, a typical inside diameter of an end cap might be 5½ inches in diameter. If so, end cap 11 would have that same inside diameter. Controller circuit board 80 is specially designed as a semi-circle having a diameter of 5¼ inches to fit within the interior of end cap 11 (see FIG. 6) as shown in FIG. 9.

The present disclosure has been described herein in connection with a pump/motor assembly in a swimming pool environment, but is applicable to any electric motor that requires cooling in its end cap. Other applications are contemplated.

Where this application has listed the steps of a method or procedure in a specific order, it may be possible or even expedient in certain circumstances, to change the order in which some steps, are performed, and it is intended that the particular steps of the method or procedure claim set forth herebelow not be construed as being order-specific unless, such order specificity is expressly stated in the claim.

While the preferred embodiments of the devices and methods have been described in reference to the environment in which they were developed, they are merely illustrative of the principles of the inventions. Modification or combinations of the above-described assemblies, other embodiments, configurations, and methods for carrying out the invention, and variations of aspects of the invention that are obvious to those of skill in the art are intended to be within the scope of the claims.

What is claimed is:

1. An end cap for a motor housing containing an electric motor, comprising:
   a tubular structure defining an interior space, comprising:
   an open first end connectable to the motor casing;
   a second end, comprising:
     a first planar surface;
     a second planar surface longitudinally offset from the first planar surface and substantially parallel to the first planar surface; and
     an air grate surface longitudinally extending between the first and second planar surfaces, extending substantially perpendicular to the first planar surface and the second planar surface, and positioned between and attached to the first planar surface and the second planar surface to form a step therebetween, and wherein the air grate surface includes at least one air grate extending therethrough, configured to permit air flow into and/or out of the interior space and opening in a direction substantially parallel to the first and second planar surfaces.

2. The end cap of claim 1, wherein the air grate surface includes two air grates each positioned substantially along a different radial line of the end cap.

3. The end cap of claim 2, wherein the air grate surface is one of a planar surface, a multi-faceted surface or an arcuate surface.

4. The end cap of claim 1, further comprising:
   circuit board mountings positioned within the interior space configured to attach a circuit board thereto; and
   end cap mountings positioned to attach the end cap to the electric motor.

5. The end cap of claim 1, wherein the air grate surface additionally comprises a switch receptacle configured to receive a control switch mounted therein.

6. The end cap of claim 5, wherein the switch receptacle is positioned between two air grates.

7. An end cap for a motor housing containing an electric motor, comprising:
   a tubular structure defining an interior space, comprising:
   an open first end connectable to the motor casing;
   a second end, comprising:
     a first planar surface;
     a second planar surface offset from the first planar surface and substantially parallel to the first planar surface; and
     an air grate surface substantially perpendicular to the first planar surface and the second planar surface and positioned between and attached to the first planar surface and the second planar surface, wherein
     the air grate surface includes two air grates positioned to radially face one another such that as the motor rotates, a directional air flow is created within the interior space generating air flow through the air grates with one air grate as an intake air grate and the other air grate as an exhaust air grate.

8. The end cap of claim 7, wherein the air grates are each positioned substantially parallel to radial lines of the end cap.

9. The end cap of claim 7, wherein the air grate surface is multi-faceted.

10. The end cap of claim 9, wherein the air grate surface is five-sided, with two said sides comprising air grates radially angled to face one another, and said remaining sides all substantially parallel with one another, such that said sides of said multi-faceted air grate surface alternate between sides containing said respective air grates and sides omitting air grates.

* * * * *